United States Patent [19]
Simpson, Jr.

[11] Patent Number: 4,932,764
[45] Date of Patent: Jun. 12, 1990

[54] OPTICAL SYSTEM FOR USE IN PHOTOGRAPHIC DEVICES

[75] Inventor: John M. Simpson, Jr., Webster, N.Y.

[73] Assignee: Eastman Kodak Company, Rochester, N.Y.

[21] Appl. No.: 312,516

[22] Filed: Feb. 21, 1989

[51] Int. Cl.$^5$ ............................................. G02B 13/06
[52] U.S. Cl. .................................. 350/441; 350/450; 350/480
[58] Field of Search ............... 350/441, 432, 450, 462, 350/464, 480; 352/118

[56] References Cited

U.S. PATENT DOCUMENTS 55,195  5/1866  Zentmayer .
1,082,678  12/1913  Casler .
2,586,418  2/1952  Davis .................................. 88/57
3,006,248  10/1961  Linke et al. ......................... 88/57

OTHER PUBLICATIONS

Lens Design Fundamentals by Rudolf Kingslake; III. A Periscopic Lens; pp. 215–218.

Primary Examiner—Paul M. Dzierzynski

[57] ABSTRACT

An optical system comprising two elements suitable for use in photographic devices having cylindrical image surfaces. This system has low distortion and is particularly well suited for use in cameras which create large aspect ratio images, with the larger dimension of the image area being curved in conforming with the cylindrical image plane.

18 Claims, 1 Drawing Sheet

OPTICAL SYSTEM FOR USE IN PHOTOGRAPHIC DEVICES

BACKGROUND OF THE INVENTION

1. Field of the Invention

This invention relates to optical systems comprising two elements suitable for use in photographic devices having cylindrical image surfaces.

2. Description Relative to the Prior Art

A two-element camera objective lens system with a curved image surface was disclosed in U.S. Pat. No. 1,082,678. The lens system therein disclosed worked with "a flexible film used for making the negative to conform more accurately to a focal surface of the lens, with consequent improvement in the definition of the image." According to the inventor of U.S. Pat. No. 1,082,678, the curved image surface was largely introduced to compensate for "spherical aberration". The inventor did not teach how to design a lens that is best suited for imaging an object onto a curved image surface. Instead, the inventor explicitly states that the design of a well-corrected system consisting of two or more elements is a very difficult task and it is to avoid doing so that he has made his invention.

U.S. Pat. No. 3,006,248 by W. R. Linke (issued in 1961) discloses an objective for a camera having a cylindrical image surface and comprises two meniscus lenses. The disclosed lens system, "while of the symmetrical type is not completely symmetrical". It has a rear landscape lens with a meniscus corrector lens in front. The power of the front lens is weaker than the power of the second lens. This lens system is corrected for lateral color as in a periscopic lens; is corrected for coma in a similar fashion; and has astigmatism carefully divided about the curved image surface. Because the objective in the last mentioned design has little distortion (when analyzed with a plano image plane), it does not compensate for distortion introduced by the cylindrical image surface. Because distortion is introduced by the cylindrical image surface, the overall system suffers from distortion.

Proposals have been made for the systems including two different asymmetrically located lenses. For example, U.S. Pat. No. 55,196 (J. Zentmyer, 1866) disclosed a doublet made of meniscus lenses of different curvatures, its exterior surfaces concentric, arranged around an aperture stop. The photographic system disclosed in U.S. Pat. No. 55,196 was designed to have a wide field of view and utilized a planar (i.e., uncurved) focal plane. The draw-back of this system, according to Zentmyer is that "The lenses must of necessity be thin." FIGS. 1 through 3 of U.S. Pat. No. 55,196 show lenses that look like thin shells. Such lenses are generally difficult to make with conventional equipment, thus making them very expensive. In addition this lens is not intended for use with a curved image surface.

In his book, *Lens Design Fundamentals*, Dr. R. Kingslake teaches how to design a periscopic lens. This lens system is obtained by placing two identical landscape lenses symmetrically about a central stop. The periscopic lens has little distortion, lateral color (sometimes referred to as a lateral chromatic aberration) and coma, but has spherical aberration, astigmatism and petzval field curvature. This lens is intended for use with a flat image plane because the tangential field curvature is nearly flat. Such a lens system will have very small distortion because it is symmetrical. If the film surface is curved then the resulting picture will have large distortion. An example of a periscopic lens is disclosed in U.S. Pat. No. 2,586,418 (J. K. Davis, 1952).

SUMMARY OF THE INVENTION

An object of the present invention is to produce an inexpensive two-element lens system suitable for use in a camera having a cylindrical image surface.

It is to be considered, for purposes of the present patent specification, that cylindrical image surface means an image surface which conforms to any surface that can have a spherical or a conic cross section curved toward the lens.

Another object of the present invention is to produce a two-element optical objective that is well corrected for distortion in order to compensate for the curvature of the cylindrical image surface.

To accomplish this, a different approach was taken than that of Linke. Linke uses a basically periscopic configuration and deliberately introduces astigmatism and field curvature in order to have a good definition over the cylindrically curved image surface. On the other hand, the present design works like a front landscape lens, but at a higher speed. A lens system in accordance with present invention has two optical components that are so formed as to create a very distorted image on a planar image plane; the distortion being such as to compensate for the distortion introduced by the curvature of the cylindrical image surface, whereby the image created on the image surface is essentially distortion free. The two optical components in the specific embodiments subsequently herein described are two meniscus-shaped singlet lenses; however, a cemented doublet may be substituted for either front or rear lens or for each of the two lenses individually. Because of distortion, the resultant design is not symmetrical. The design according to the invention has a flat sagital field corrected about the curved plane. The present configuration consists of a front meniscus lens that functions as a landscape lens and a second lens that functions as a meniscus corrector. The front lens has a shorter focal length than the second lens.

While Linke's design is corrected for the lateral color when both elements are made from the same material, the present design utilizes two different materials for the lenses when lateral color correction is desired. If the lens elements are thick and curvatures are sharp, a very good aberration correction can be obtained. However, if cost is important and lenses are injection molded from plastic, thick elements with sharply curved surfaces become undesirable. Tooling costs increase due to the sharply curved surfaces, while the time to cure increases as lens thickness increases, resulting in a more expensive lens to manufacture. In addition, elements need to have enough edge thickness to provide a big enough gate for plastic to flow through. This requirement conflicts with the need for sharp curves. If the edge thickness is made too small, the plastic in the gate solidifies, making it impossible to impart any more pressure into the cavity.

During the course of design it was found that an optical system consisting of an aperture stop located between two asymmetrical meniscus elements, arranged so that their concave surfaces are toward each other and toward the aperture stop, when the central thickness (CT) of the elements is given by $1 < CT < 4$ mm., while the edge thickness (ET) is given by $0.6 < ET < 3.9$ mm. satisfied the requirements of being inexpensive to mold while maintaining a good aberration correction.

BRIEF DESCRIPTION OF THE DRAWINGS

Several embodiments of the present invention will now be described, by way of example, with reference to the accompanying drawings, in which.

Similar features in each of the embodiments are given the same numeral but with a different suffix.

DETAILED DESCRIPTION OF THE PREFERRED EMBODIMENT

Figure 1:
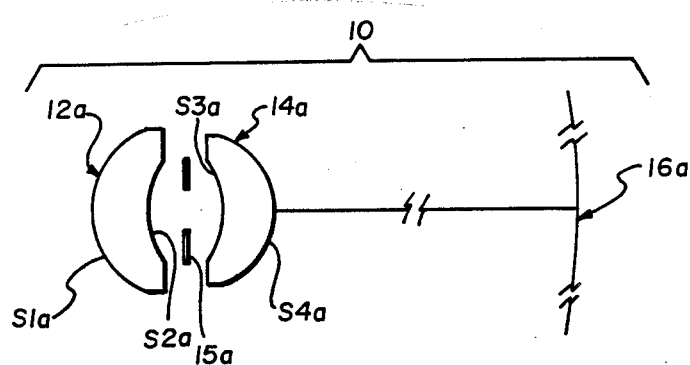
FIG. 1 shows the outline of the lens in a first embodiment.
Figure 2:
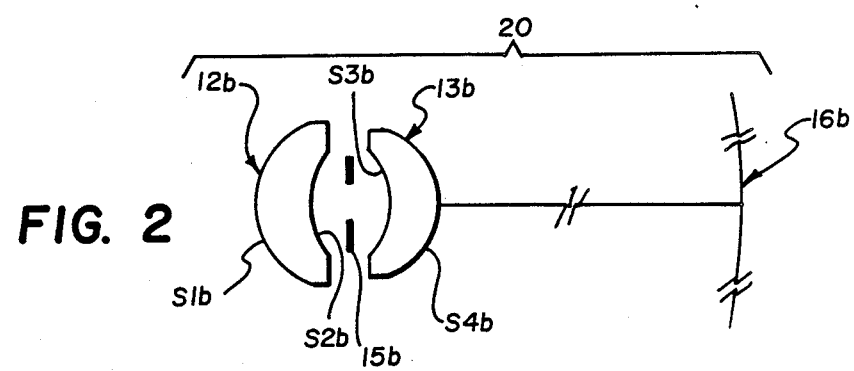
FIG. 2 shows the outline of the lens in a second embodiment.
Figure 3:
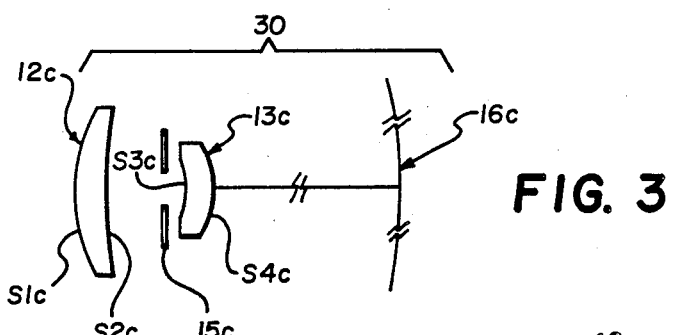
FIG. 3 shows the outline of the lens in a third embodiment.
Figure 4:
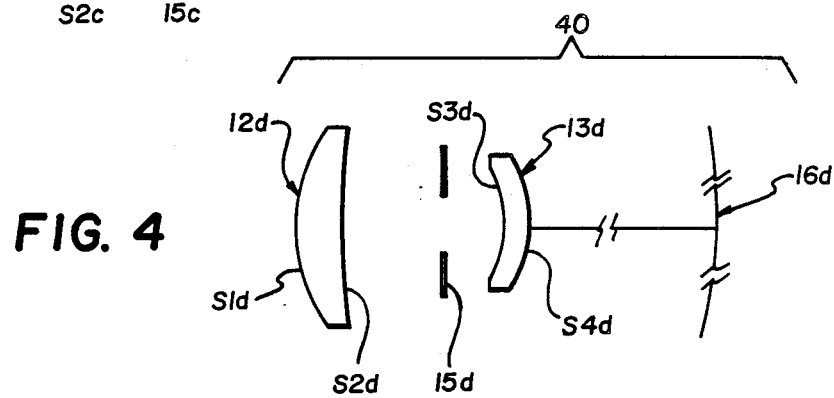
FIG. 4 shows the outline of the lens in a fourth embodiment.

The following embodiments of the present invention consist of an optical system imaging an object on a cylindrical image surface 16. The optical system comprises an aperture stop 15 and two different lenses 12 and 14, disposed at the front and at the rear, respectively. The front lens 12 functions as a landscape lens and the rear lens 14 functions as a meniscus corrector. The front lens 12 has a shorter focal length than the rear lens 14. In some of the embodiments the lenses 12 and 14 are disposed asymmetrically relative to the stop 15. In the first embodiment, the focal length of optical system 10 is 24 mm., the F number is 11 and the full field of view is 77.5 degrees. Since the amount of astigmatism is reduced when optical elements become thicker, the optical system 10 has an excellent performance due to relative thickness of lenses 12a and 14a. Both of lenses 12a and 14a are made from the same type of plastic; therefore, lateral color in lens system 10 is not corrected.

The second embodiment is very similar to the first. Optical system 20 is constructed from two relatively thick meniscus lenses 12b and 14b. However, lateral color is corrected because the lens systems is designed with two different materials for its elements.

In the third embodiment, the focal length of optical system 30 is 25 mm., the F number is 11 and the full field of view is 75.8 degrees. Optical system 30 has better illumination in the corner than optical system 10. It is also cheaper to manufacture due to thinner elements. Lenses in optical system 30 are made from two different plastics.

In the fourth embodiment, the focal length of the optical system 40 is 36 mm., the F number is 8 and the full field of view is 62.6 degrees. Lenses 12d and 13d of the system 40 are made from the same plastic. Optical system 40 is less expensive to manufacture than systems 10 and 20 due to thinner lenses 12d and 13d.

The following are the numerical examples of embodiments 1 through 4:

| SURFACE | R | D | REFRAC- TIVE INDEX | Abbe V NUMBER |
|---|---|---|---|---|
| EXAMPLE 1 | | | | |
| S1a | 5.56538 | 3.920 | 1.492 | 57.4 |
| S2a | 7.11637 | 2.519 | | |
| | Diaphragm | 2.519 | | |
| S3a | −5.33878 | 3.352 | 1.492 | 57.4 |
| S4a | −5.14086 | | | |
| EXAMPLE 2 | | | | |
| S1b | 5.8262 | 3.7595 | 1.494 | 57.6 |
| S2b | 7.5995 | 2.925 | | |
| | Diaphragm | 2.925 | | |
| S3b | −5.5167 | 2.888 | 1.595 | 31.2 |
| S4b | −5.4769 | | | |
| EXAMPLE 3 | | | | |
| S1c | 12.0211 | 2.000 | 1.492 | 57.4 |
| S2c | 29.4280 | 3.795 | | |
| | Diaphragm | 1.495 | | |
| S3c | −9.44980 | 1.633 | 1.590 | 30.9 |
| S4c | −7.56870 | | | |
| EXAMPLE 4 | | | | |
| S1d | 14.2440 | 2.500 | 1.492 | 57.4 |
| S2d | 31.8270 | 6.740 | | |
| | Diaphragm | 3.545 | | |
| S3d | −12.8370 | 2.047 | 1.492 | 57.4 |
| S4d | −10.2400 | | | |

Where R is the radius of curvature for a surface, and D stands for axial thickness and air separations.

While in the embodiments specifically described above all of the surfaces are spherical, it is to be understood that other embodiments of this invention may have nonspherical surfaces. It is also to be understood that other embodiments of the present invention may be scaled up or down.

Also, it should be obvious that weak spherical components which do not significantly alter third order aberration corrections or the like might also be employed, but the term "element" is not intended to include such components for purposes of the present application.

Optical systems in accordance with the present invention are particularly well suited for use in cameras which create large aspect ratio images, with the larger dimension of the image area being curved in conformity with the cylindrical image surface.

The invention has been described in detail with particular reference to a presently preferred embodiment, but it will be understood that variations and modifications can be effected within the spirit and scope of the invention.

What is claimed is:

1. A wide angle optical system for use in a camera having a cylindrical image surface, said system comprising an aperture stop and two different lenses, one disposed at the front of said aperture stop and the other disposed at the rear of said aperture stop, wherein said front lens functions as a landscape lens and has a shorter focal length than said rear lens and said rear lens functions as a meniscus corrector.

2. An optical system having a cylindrical image surface, said optical system comprising two different lenses and an aperture stop, said aperture stop positioned between said two different lenses, one of said lenses being disposed at the front of said aperture stop and the other being disposed at the rear of said aperture stop, wherein:

said front lens functions as a landscape lens and has a shorter focal length than said rear lens and said rear lens functions as a meniscus corrector, said front lens having a convex front surface and a concave rear surface; and said rear lens having a concave front surface facing said aperture stop and a convex rear surface facing said cylindrical image surface.

3. An optical system as claimed in claims 1 or 2, wherein said lenses are asymmetrically located relative to said stop.

4. An optical system as claimed in claim 1 or 2, wherein said lenses are so formed as to cause distortion in an image on a plano image plane, the distortion being such as to compensate the distortion introduced by the curvature of the cylindrical image surface, whereby the image created on the image plane of the system is essentially distortion free.

5. An optical system as claimed in claim 3 wherein said lenses are so formed as to cause distortion in an image on a plano image plane, the distortion being such as to compensate the distortion introduced by the curvature of the cylindrical image surface, whereby the image created on the image plane of the system is essentially distortion free.

6. An objective lens system comprising spaced lenses having an aperture stop located therebetween and a cylindrical image surface, said lenses comprising a first component, said first component having a meniscus shape disposed with its concave surface directed to the aperture stop, and a second meniscus shaped component disposed with its concave surface directed toward said first component, said first component having a shorter focal length than said second component.

7. An objective lens system as claimed in claim 6 wherein said lenses are so formed as to cause distortion in an image on a plano image plane, the distortion being such as to compensate for the distortion introduced by the curvature of the cylindrical image surface, whereby the image created on the image plane of the system is essentially distortion free.

8. An optical system having a cylindrical image surface, said optical system consisting essentially of two different lenses, front and rear, wherein said front lens has a shorter focal length than said rear lens, said lenses being so formed as to cause distortion in an image on a plano image plane, the distortion being such as to compensate the distortion introduced by the curvature of the cylindrical image surface, whereby the image created on the image surface of the system is essentially distortion free.

9. An optical system for imaging an object onto a cylindrical image surface, said optical system comprises an aperture stop located between two different meniscus lenses, one of the lenses disposed at the front of said aperture stop and the other disposed towards the rear of said aperture stop wherein the lens located in front of said aperture stop has a shorter focal length than the other lens, said lenses being so formed as to cause distortion in an image on a plano image plane, the distortion being such as to compensate the distortion introduced by the curvature of the cylindrical image surface, whereby the image created on the image plane of the system is essentially distortion free.

10. An optical system as claimed in claim 1, 2, 8 or 9, further fulfilling the following two requirements:
1 mm. < CT < 4 mm.
0.6 mm. < ET < 3.9 mm.
where CT is the center thickness of an element and ET is the edge thickness of an element.

11. An optical system as claimed in claim 3, further fulfilling the following two requirements:
1 mm. < CT < 4 mm.
0.6 mm. < ET < 3.9 mm.
where CT is the center thickness of an element and ET is the edge thickness of an element.

12. An optical system according to claim 1 2, 8 or 9, wherein lateral color is corrected by choice of at least two different optical materials.

13. An optical system according to claim 3 wherein lateral color is corrected by choice of at least two different optical materials.

14. An objective lens system comprising asymmetrically spaced lenses having an aperture stop located therebetween, said lenses comprising a first component having a meniscus shape disposed with its concave surface directed to the center of said objective, and a second meniscus shaped component disposed with its concave surface directed toward said first component, said first component having a shorter focal length than the said second component, and said components further fulfilling the following two requirements:
1 mm. < CT < 4 mm.
0.6 mm. < ET < 3.9 mm.
where CT is the center thickness of an element and ET is the edge thickness of an element.

15. An optical system according to claim 1 and conforming substantially to the specifications in the following table:

| SURFACE | R | D | REFRACTIVE INDEX | Abbe V NUMBER |
|---|---|---|---|---|
| S1a | 5.56538 | 3.920 | 1.492 | 57.4 |
| S2a | 7.11637 | 2.519 | | |
| | Diaphragm | 2.519 | | |
| S3a | −5.33878 | 3.352 | 1.492 | 57.4 |
| S4a | −5.14086 | | | | wherein the radii of curvature R, the thickness and the spaces D are specified.

16. An optical system according to claim 1 and conforming substantially to the specifications in the following table:

| SURFACE | R | D | REFRACTIVE INDEX | Abbe V NUMBER |
|---|---|---|---|---|
| S1b | 5.8262 | 3.7595 | 1.494 | 57.6 |
| S2b | 7.5995 | 2.925 | | |
| | Diaphragm | 2.925 | | |
| S3b | −5.5167 | 2.888 | 1.595 | 31.2 |
| S4b | −5.4769 | | | | wherein the radii of curvature R, the thickness and the spaces D are specified.

17. An optical system according to claim 1 and conforming substantially to the specifications in the following table:

| SURFACE | R | D | REFRACTIVE INDEX | Abbe V NUMBER |
|---|---|---|---|---|
| S1c | 12.0211 | 2.000 | 1.492 | 57.4 |
| S2c | 29.4280 | 3.795 | | |
| | Diaphragm | 1.495 | | |
| S3c | −9.44980 | 1.633 | 1.590 | 30.9 |
| S4c | −7.56870 | | | | wherein the radii of curvature R, the thickness and the spaces D are specified.

18. An optical system according to claim 1 and conforming substantially to the specifications in the following table:

| SURFACE | R | D | REFRACTIVE INDEX | Abbe V NUMBER |
|---|---|---|---|---|
| S1d | 14.2440 | 2.500 | 1.492 | 57.4 |
| S2d | 31.8270 | 6.740 | | |
| | Diaphragm | 3.545 | | |
| S3d | −12.8370 | 2.0471 | 1.492 | 57.4 |
| S4d | −10.2400 | | | | wherein the radii of curvature R, the thickness and the spaces D are specified.

* * * * *

UNITED STATES PATENT AND TRADEMARK OFFICE
CERTIFICATE OF CORRECTION

PATENT NO. : 4,932,764

DATED : June 12, 1990

INVENTOR(S) : John M. Simpson, Jr.,

It is certified that error appears in the above-identified patent and that said Letters Patent is hereby corrected as shown below:

On the title page, item [21]: 312,516, should be corrected to read:
[21] Appl. No: 312,156

Signed and Sealed this

Second Day of July, 1991

Attest:

HARRY F. MANBECK, JR.

*Attesting Officer*     Commissioner of Patents and Trademarks